INVENTOR
PIERRE ERNEST MERCIER

ATTORNEYS

INVENTOR
PIERRE ERNEST MERCIER
By Wenderoth, Lind & Ponack
ATTORNEYS

Sept. 29, 1964 P. E. MERCIER 3,150,572
DISCHARGE VALVE AND ITS APPLICATION TO THE AUTOMATIC
REGULATION OF A HYDRAULIC INSTALLATION PUMP
Filed April 24, 1961 3 Sheets-Sheet 3

INVENTOR
PIERRE ERNEST MERCIER

By Wenderoth, Lind & Ponack
ATTORNEYS

United States Patent Office 3,150,572
Patented Sept. 29, 1964

3,150,572
DISCHARGE VALVE AND ITS APPLICATION TO THE AUTOMATIC REGULATION OF A HYDRAULIC INSTALLATION PUMP
Pierre Ernest Mercier, 1 Rte. de St. Brice, Piscop by Saint Brice, France
Filed Apr. 24, 1961, Ser. No. 105,047
1 Claim. (Cl. 92—133)

The present invention has first for an object a discharge valve in which the opposing elastic element acting upon the movable equipment acts with a progressively decreasing effect when the movable equipment is displaced under the predominant effect of the pressure and vice versa.

It is particularly an object to construct an elastic element particularly simple and efficacious.

The present application also has for an object the application of such a valve to the automatic requlation arrangement of a hydraulic installation pump.

Automatic regulating devices are already known having the purpose of putting the pump of a hydraulic installation out of action when the delivery pressure reaches a maximum critical value, and, vice versa, to put this pump into action in the hydraulic circuit when the delivery pressure reaches a minimum value.

In these known devices, the putting of the pump into or out of action is effected by a slide-valve which takes up the opposing forces, on the one hand, of the pressure prevailing in the utilization circuit or an accumulator and which, on the other hand, acts on a resilient device 47, 44 opposing the action of this pressure.

The action of the resilient device in these regulating installations increases when the slide-valve moves under the predominant action of the pressure prevailing in the accumulator owing to the displacement of the slide-valve which moves against its resilient device whose reaction increases progressively the more this resilient device is compressed. Actually, it is known that the strength of a spring or a torsion bar is appreciably proportional to its distortion.

This causes a functioning of the regulation giving rise to prejudicial oscillatory rates for the pump and its utilization.

The present invention has firstly the purpose of obviating these disadvantages and ensuring the free working of the regulator while avoiding oscillatory conditions.

To this end, the resilient device acting on the slide-valve against the action of the pressure prevailing in the accumulator is so established that when the slide-valve 35 moves under the predominant effect of the delivery pressure, the force opposed by the resilient device is constantly and progressively decreasing throughout the stroke of the slide-valve.

Vice versa, when the slide-valve moves in the opposite direction, under the predominating effect of the resilient device, the force of said resilient device is constantly and progressively increasing throughout the stroke of the slide-valve.

An automatic regulating device enabling the aforementioned purposes to be achieved possesses the characteristics which result from the text and more particularly the attached claim.

Regulating devices according to the invention are shown by way of example in the attached drawings, in which.

Figure 1:
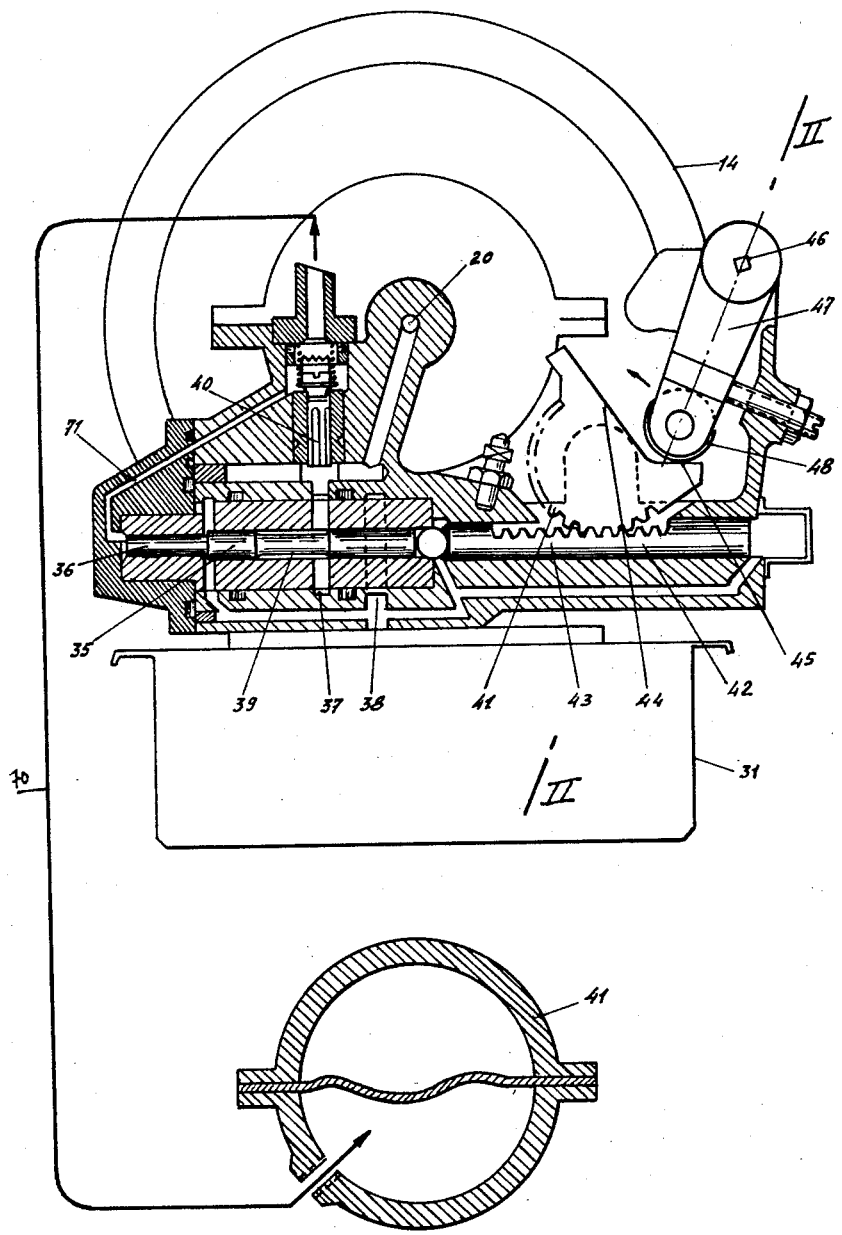
FIGURE 1 is a sectional elevation view of a first regulating device for a hydraulic pump delivering on an accumulator.

According to an arrangement known in itself (FIGURES 1 and 2) the pump 14 with inlet opening 28 and delivery opening 20 supplies either a utilization circuit or as shown in FIGURE 1 an accumulator 41 through a non-return valve 40 intercalated in the connection piping 70 between the delivery opening 20 of the pump 14 and the accumulator 41 so as to prevent said accumulator 41 emptying through the pump.

This arrangement also comprises an automatic regulating device which has the purpose of putting the pump of a hydraulic installation out of action when the delivery pressure reaches a maximum critical value, and vice versa, to put this pump into action in the hydraulic circuit when the delivery pressure reaches a minimum value.

This regulating device comprises a slide-valve 35 in equilibrium between the pressure prevailing in the accumulator 41 (pressure brought by the piping 71) and an opposing resilient device acting from the other side of the slide-valve 35 and opposing the action of the pressure of the accumulator.

This slide-valve 35 comprises a groove 39 cooperating with channels 37 and 38 so as to put the pump 14 out of action when the delivery pressure reaches a maximum predetermined value, and vice versa, to put this pump 14 into action in the hydraulic circuit 70 when the delivery pressure reaches a minimum predetermined value.

This double action takes place in the following manner:

(a) When delivery pressures are lower than the predetermined minimum value, the slide-valve 35 moves to the left under the predominating action of the opposing resilient device. In this position the groove 39 of the slide-valve 35 does not effect communication between the channel 37 connected to the delivery opening 20 of the pump and the channel 38 connected to the tank 31. The pump 14 also supplies the accumulator 41 from the delivery opening 20, and through the non-return valve 40 and piping 70;

(b) When the delivery pressure has reached the maximum predetermined value, the slide-valve 35 moves to the right under the predominating effect of this pressure against the action of the resilient device. In this position the channels 37 and 38 are put into communication by the groove 39 of the slide-valve 35 and the delivery 20 of the pump 14 is connected to the tank.

The non-return valve 40 intercalated between the delivery 20 of the pump and the accumulator 41 prevents the latter from emptying through the pump.

The position of the slide-valve 35 for ensuring one or other of these two roles in function of the delivery pressure, i.e., of the pressure prevailing in the accumulator 41 is controlled by the fact that said slide-valve takes up the opposing forces, on the one hand, of the pressure prevailing in the accumulator 41 and which acts upon a push-rod 42 integral with the slide-valve, and on the other, of a resilient device 46, 47, 44 opposing the action of this pressure.

This opposing resilient device is, according to the invention, so established that, when the slide-valve 35 moves under the predominating effect of the delivery pressure, the force opposed by the resilient device is constantly decreasing throughout the stroke of the slide-valve.

Vice versa, when the slide-valve moves in the opposite direction under the predominating effect of the resilient device, the force of said resilient device is constantly increasing throughout the whole of its stroke.

This arrangement ensures the free working of the regulator and avoids oscillatory conditions.

The resilient device possessing the above-mentioned characteristic is established according to the case of FIGURE 1.

The slide-valve 35 acts on the push-rod 42 carrying a rack 43. This rack engages with a toothed sector 44, 41 whose lower face 45 forms a cam. The resilient member is, for example, a torsion bar 46. This bar acts on this cam 45 by means of a roller 48 lever 47.

Figure 3:
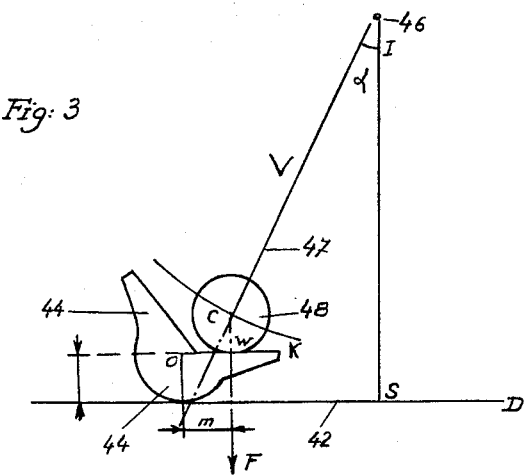
FIGURES 3 and 4 are diagrams showing how the opposing resilient force of the device of FIGURE 1 diminishes when the slide-valve moves under the predominating action of the delivery pressure respectively in the position of the slide-valve to the left and slide-valve to the right.
Figure 4:
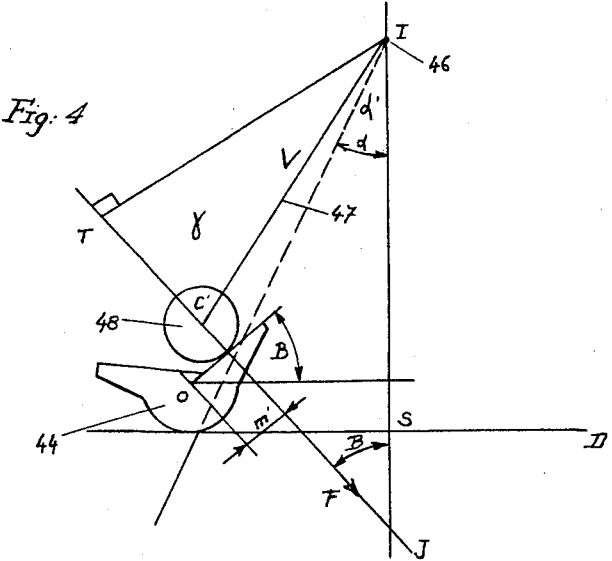

The diagrams of FIGURES 3 and 4 show how the opposing resilient force diminishes when the slide-valve moves against the predominating action of the pressure of the accumulator 41 respectively in the right-hand position (FIGURE 3) and left-hand position (FIGURE 4) of the slide-valve. In the diagram of FIGURE 3 the cam OK has been taken acting through the center of the sector 44, and parallel to the abscissa right D, of the rack 42. $r$ denotes the radius of the sector 44.

In position 1 (FIGURE 3), slide-valve 35 to the left of the contact point of the roller 48 of the lever 47 is the distance $m$ from $o$. Let $\alpha$ be the slope of the lever in relation to SI perpendicular to D.

According to the diagram of FIGURE 4 (rack 42 at the end on the right) the cam is raised along OK' forming the angle $\beta$ with D. In the case of FIGURE 4, $m'$ distance to 0 of the contact point of the roller 48 is still of the same order of magnitude as $m$.

Let $\alpha'$ be the slope $>\alpha$ of the lever on SI, and $Q_0$ the torsion torque of the bar in the case of FIGURE 1.

To the torque $Q_0$ there corresponds the force F applied at C, defined by:

$$F \times L \sin \alpha = Q_0$$

This force $$F = \frac{Q_0}{L \sin \alpha}$$

produced on the rack a tangential force $$U = F \times \frac{m}{r} = \frac{Q_0 m}{Lr \sin \alpha}$$

In the case of FIGURE 4, we will denote by T the projection of I on C' perpendicular to OK', the angle $$\gamma = \widehat{TC'I} = \beta + \alpha'$$

and $$TI = L \sin \gamma = L \sin (\beta + \alpha')$$

The force F' in FIGURE 4 is thus linked up to Q' by $$F'L \sin (\beta + \alpha') = Q'$$

we will put down $$Q' = Q_0 [1 + K(\alpha' - \alpha)]$$

K being the inverse of the initial torsion of the bar, seeing that the bar when we go from FIGURE 3 to FIGURE 4 is twisted by $(\alpha' - \alpha)$.

We thus have $$F' \times L \sin (\beta + \alpha') = Q_0 [1 + K(\alpha' - \alpha)]$$

$$F' = \frac{Q_0 (1 + K(\alpha' - \alpha))}{L \sin (\beta + \alpha')}$$

and to F' correspond $$U' = F' \frac{m'}{r}$$

and seeing that $m$ is little different to $m'$ we thus have finally $$\frac{F'}{F} = \frac{1 + K(\alpha' - \alpha)}{\sin (\beta + \alpha')} \sin \alpha$$

so that F' be less than F, it thus suffices that $$\frac{\sin \alpha}{\sin (\beta + \alpha')} < \frac{1}{1 + K(\alpha' - \alpha)}$$

it suffices to choose K in certain limits while considering that $$\beta + \alpha' < 90°$$

in the case considered, and $\alpha' > \alpha$.

According to the arrangements of FIGURE 3, we may effect $m' < m$ which still further facilitate the solving of the problem.

Figure 5:
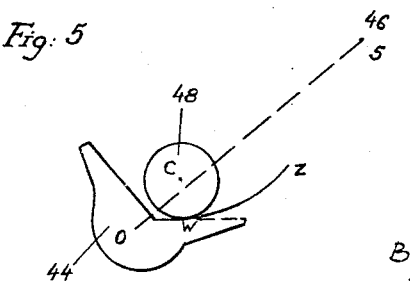
FIGURE 5 shows an alternative of the cam utilized in FIGURE 1.

According to another form of embodiment (FIGURE 5) the cam 44 is thrown off center and we have the contact point W available of the cam and roller so that in the position of FIGURE 3 the three points O, W, I approach a straight line.

In this case, when we pass from the position of FIGURE 3 to that of FIGURE 4 the tangency point of the roller shifts towards R which is unfavorable from the standpoint of the ratio $m'/m$. However, by replacing the straight cam by an arch such as WZ we can, in the position of FIGURE 4, have:

$$F' = \frac{Q'}{L}$$

instead of $$F' = \frac{Q'}{L \sin (\beta + \alpha')}$$

which will compensate, and more than compensate for the loss on $m'/m$.

All these arrangements enable a working of the free regulator and without oscillation. The deviation of pressure existing between the values of the resilient force applied to the slide-valve 35 in these two extreme positions determines the difference of pressures between which the regulator functions. This means to say that when the slide-valve 35 is to the left, the action of the resilient member balances the maximum limit pressure which must not be exceeded in the accumulator, whereas when the slide-valve 35 is to the right the weaker action of the resilient member balances the minimum pressure prevailing in the accumulator 41 and below which we must not go.

Figure 2:
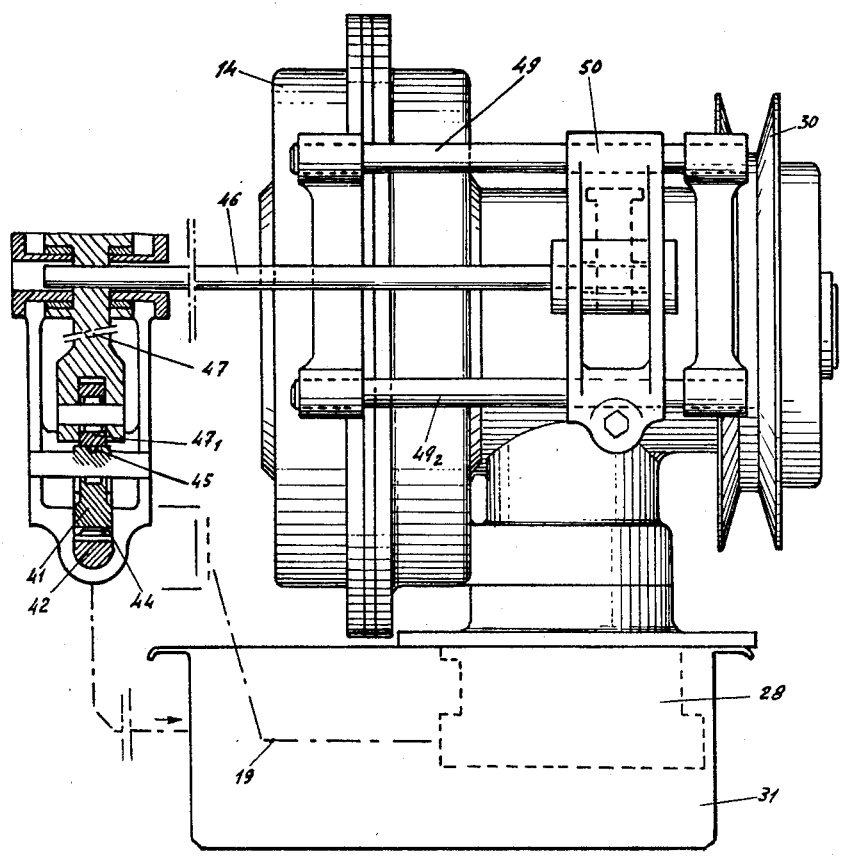
FIGURE 2 is a side view corresponding to FIGURE 1 with partial section along the line II—II of FIGURE 1.

FIGURE 2 shows in particular an arrangement enabling the deviation of pressures of the accumulator to be regulated outside of which the regulator intervenes and according to which the actual length of the torsion bar 46 is modified, which acts as a spring. To this end, the end of the torsion bar 46 opposite to that where the lever 47 is fixed comprises an anchorage sliding along the torsion bar 46. This anchorage is formed by a carriage 50 able to move along parallel guiding rods $49_1$, $49_2$.

The height of the regulating threshold may be adjusted by regulating the initial twist of the torsion bar 46.

Numerous modifications may be applied to the device described above without going outside of the scope of the invention for that purpose.

Obviously, the invention is not restricted to the examples of embodiment described above which can always

What I claim is:

In a valve, a slide subjected on one hand to the action of pressure and on the other hand to the action of an elastic arrangement opposing a decreasing effect when said slide is displaced under the predominant action of the pressure, said elastic arrangement comprising an elastic element formed by a torsion bar, a cam having a profile whereby the back pressure effect of said elastic arrangement decreases progressively when said slide is displaced under the predominant action of the pressure and vice versa, a rack bar engaging with said cam cooperating with said slide to transmit a longitudinal movement of said slide to said cam by transforming it into a rotation movement of said cam, a lever fixed to said torsion bar cooperating at its other end with said cam to transmit the torsion reactions of said bar to said cam, which transmits them to said slide through the intermediary of said rack bar.

References Cited in the file of this patent

UNITED STATES PATENTS

| | | |
|---|---|---|
| 1,449,646 | Bathrick | Mar. 27, 1923 |
| 1,501,038 | Brooks | July 15, 1924 |
| 1,695,368 | Conrader | Dec. 18, 1928 |
| 2,125,596 | Trager | Aug. 2, 1938 |
| 2,523,192 | Brown | Sept. 19, 1950 |
| 2,534,761 | Panhard | Dec. 19, 1950 |
| 2,573,761 | Firth | Nov. 6, 1951 |

FOREIGN PATENTS

| | | |
|---|---|---|
| 199,265 | Switzerland | Feb. 16, 1939 |
| 250,989 | Switzerland | July 16, 1948 |
| 1,036,573 | France | Apr. 29, 1953 |

UNITED STATES PATENT OFFICE
CERTIFICATE OF CORRECTION

Patent No. 3,150,572                                           September 29, 1964

Pierre Ernest Mercier

It is hereby certified that error appears in the above numbered patent requiring correction and that the said Letters Patent should read as corrected below.

Column 1, before line 10, insert the following as the first paragraph of the specification:

> This application is a Continuation-in-Part of application Serial No. 604,043, filed August 14, 1956, now abandoned, which latter application was a division of application Serial No. 502,123, filed April 18, 1955, now abandoned.

Signed and sealed this 6th day of April 1965.

(SEAL)
Attest:

ERNEST W. SWIDER                                        EDWARD J. BRENNER
Attesting Officer                                            Commissioner of Patents